United States Patent
Kim et al.

(10) Patent No.: US 9,664,089 B2
(45) Date of Patent: May 30, 2017

(54) FAULT DIAGNOSIS METHOD OF SCR SYSTEM AND AN APPARATUS THEREOF

(71) Applicant: Hyundai Motor Company, Seoul (KR)

(72) Inventors: Mi-Jin Kim, Gwacheon-si (KR); Jong-Ik Chun, Seoul (KR); Soon-Hyung Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/720,165

(22) Filed: May 22, 2015

(65) Prior Publication Data

US 2016/0160729 A1    Jun. 9, 2016

(30) Foreign Application Priority Data

Dec. 3, 2014   (KR) .................. 10-2014-0172060

(51) Int. Cl.
*F01N 11/00* (2006.01)
*F01N 3/20* (2006.01)

(52) U.S. Cl.
CPC .............. *F01N 11/00* (2013.01); *F01N 3/208* (2013.01); *F01N 3/2066* (2013.01); *F01N 2560/026* (2013.01); *F01N 2610/02* (2013.01); *F01N 2900/0416* (2013.01); *F01N 2900/1811* (2013.01); *Y02T 10/24* (2013.01); *Y02T 10/47* (2013.01)

(58) Field of Classification Search
CPC .. F01N 11/00; F01N 2550/02; F01N 2550/05; F01N 2900/1621; F01N 2900/1811; F01N 2900/1818

See application file for complete search history.

(56) References Cited

U.S. PATENT DOCUMENTS

| | | | |
|---|---|---|---|
| 2008/0022658 A1* | 1/2008 | Viola | F01N 3/035 60/286 |
| 2013/0060486 A1 | 3/2013 | Takahashi et al. | |
| 2013/0317727 A1* | 11/2013 | Kowalkowski | F02D 41/123 701/112 |

FOREIGN PATENT DOCUMENTS

| | | |
|---|---|---|
| JP | 2003-201828 A | 7/2003 |
| JP | 2008-274765 A | 11/2008 |
| JP | 10-2009-0079973 A | 7/2009 |
| JP | 2009-197741 A | 9/2009 |
| JP | 2011-226293 A | 11/2011 |
| JP | 2012-233415 A | 11/2012 |
| JP | 5574120 B2 | 7/2014 |
| KR | 10-2009-0125898 A | 12/2009 |
| KR | 10-1088316 B1 | 11/2011 |

* cited by examiner

*Primary Examiner* — Jonathan Matthias
(74) *Attorney, Agent, or Firm* — Morgan Lewis & Bockius LLP

(57) ABSTRACT

A fault diagnosis method of an exhaust gas post-processing system may include a detection step detecting any one or more of an operating state of a lean NOx trap or a state of an urea tank, a determination step determining whether the state of the lean NOx trap or the urea tank detected at the detection step satisfies a corresponding condition to block monitoring of a purification efficiency of the exhaust gas post-processing system, and a blocking step blocking the monitoring of the purification efficiency of the exhaust gas post-processing system when the state of the lean NOx trap or the urea tank at the determination step satisfies the corresponding condition to block the monitoring of the purification efficiency of the exhaust gas post-processing system.

3 Claims, 4 Drawing Sheets

FAULT DIAGNOSIS METHOD OF SCR SYSTEM AND AN APPARATUS THEREOF

CROSS-REFERENCE TO RELATED APPLICATION

The present application claims priority of Korean Patent Application Number 10-2014-0172060, filed on Dec. 3, 2014, the entire contents of which are incorporated herein for all purposes by this reference.

BACKGROUND OF INVENTION

Field of Invention

The present invention relates to a fault diagnosis method of a SCR system and an apparatus thereof, and more particularly, to a fault diagnosis method of a SCR system and an apparatus thereof reflecting states of a lean NOx trap and an urea tank in a lean NOx trap and a SCR complex post-processing system.

Description of Related Art

There have been the problems of serious environmental pollutions by emissions exhausted from an internal combustion engine of vehicles using fossil fuel such as gasoline or diesel. In particular, the discharging of soot, nitrogen oxide (NOx) and fine dust including soot exhausted from diesel vehicles such as buses and trucks are perceived as a serious problem, and thus, each country controls strictly emission of exhaust gas by preparing related regulations in order to solve exhaust gas problems of such above diesel vehicles.

Generally, the exhaust system of a diesel engine is provided with an exhaust gas post-processing unit such as DOC (Diesel Particulate matter Filter), DPF (Diesel Particulate matter Filter), SCR (Selective Catalyst Reduction) and LNT (Lean NOx Trap) and so on in order to reduce the pollutants contained in the exhaust gas such as carbon monoxide (CO), hydrocarbon (HC), particulate matter, and nitrogen oxides (NOx), and so on.

Among them, an exhaust gas post-processing device (hereinafter, referred to as "SCR system") using SCR may function as injecting a reducing agent such as urea inside an exhaust pipe, thereby reducing nitrogen oxides in the exhaust gas to nitrogen and oxygen. In other words, the above SCR system injects a reducing agent such as urea into an exhaust pipe, and then the reducing agent is converted to ammonia ($NH_3$) by the heat of exhaust gas, thereby reducing nitrogen oxides (NOx) to nitrogen gas ($N_2$) and water ($H_2O$) by a catalytic reaction of nitrogen oxides (NOx) and ammonia in the exhaust gas via the SCR catalyst.

A complex post-processing system equipped with 'a lean NOx trap (LNT) and SCR (Selective Catalyst Reduction) in series', as a new technology for diesel vehicles to respond to the recently intensified regulation of NOx exhaust gas, has emerged (refer to FIG. 4). Under this lean NOx trap and SCR complex post-processing system, the amount of post-injected fuel increases during the regeneration (DeNOx) of the lean NOx trap, thereby the air-fuel ratio goes down. In the NOx sensor disposed at the front and rear end of SCR to measure the mass of NOx, the measurement error increases abruptly in the condition of low air-fuel ratio due to the nature of the sensor such that the measured value in this interval cannot be reliable. However, since there was no function in a related art to consider whether the lean NOx trap is regenerated at the time of entering into monitoring the SCR purification efficiency, an erroneous detection on the purification efficiency of the SCR system may occur in the fuel-rich state of the exhaust gas.

Furthermore, if a urea tank is frozen state or cavity occurrence state, the urea supply is not smooth, thereby the purification efficiency of the SCR system decreases. However, there is no function in a related art to consider whether an urea tank is frozen state or cavity occurrence state at the time of entering into monitoring the SCR purification efficiency, thereby it may detect erroneously even the decrease of the purification efficiency in the SCR system due to a heat deterioration in the SCR catalyst or a breakdown in the urea supply line.

The information disclosed in this Background section is only for enhancement of understanding of the general background of the invention and should not be taken as an acknowledgement or any form of suggestion that this information forms the prior art already known to a person skilled in the art.

SUMMARY

The present invention has been made in an effort to solve the above and/or other problems, and is directed to provide a fault diagnosis method and apparatus of the SCR system reflecting the states of a lean NOx trap and an urea tank on purification efficiency monitoring blocking condition of the SCR system in a lean NOx trap and SCR complex post-processing system.

A fault diagnosis method of an exhaust gas post-processing system in accordance with some embodiments of the present invention may include: a detection step detecting any one or more of an operating state of a lean NOx trap or a state of an urea tank; a determination step determining whether the state of the lean NOx trap or the urea tank detected at the detection step satisfies a corresponding condition to block monitoring of a purification efficiency of the exhaust gas post-processing system; and a blocking step blocking the monitoring of the purification efficiency of the exhaust gas post-processing system when the state of the lean NOx trap or the urea tank at the determination step satisfies the corresponding condition to block the monitoring of the purification efficiency of the exhaust gas post-processing system.

The fault diagnosis method may further include an implementation step implementing the monitoring of the purification efficiency of the exhaust gas post-processing system when it is determined that the state of the lean NOx trap or the urea tank does not satisfy the corresponding condition to block the monitoring of the purification efficiency of the exhaust gas post-processing system at the determination step.

The determination step may include a first determination step determining whether the state of the lean NOx trap detected at the detection step is a regeneration state (De-NOx).

The determination step may include a second determination step determining whether the state of the urea tank detected at the detection step is a frozen state.

The determination step may include a third determination step determining whether the state of the urea tank detected at the detection step is a cavity occurrence state.

The determination step may include a condition selection step determining whether condition to block the monitoring of the purification efficiency of the exhaust gas post-processing system in the first determination step, the second determination step or the third determination is satisfied, assigning an individual bit position to the condition of the first determination step, the second determination step or the third determination, and determining whether to use any one or more conditions among the conditions of the first determination step, the second determination step and the third determination step through a bit mask.

A fault diagnosis apparatus of an exhaust gas post-processing system equipped with a selective catalyst reduction (SCR) in accordance with some embodiments of the present invention may include: a detection unit detecting any one and more of an operating state of a lean NOx trap or a state of an urea tank; a NOx sensor disposed at a front end and a rear end of the SCR and measuring a mass of NOx of the front end and the rear end of the SCR; and an electronic control unit determining whether to block monitoring of a purification efficiency of the exhaust gas post-processing system in accordance with an information detected by the detection unit and implementing the monitoring of the purification efficiency of the exhaust gas post-processing system in accordance with the mass of NOx of the front end and the rear end of the SCR measured by the NOx sensor.

The detection unit may include a lean NOx trap state detection unit detecting whether the state of the lean NOx is a regeneration state (DeNOx), an urea tank frozen state detection unit detecting whether the state of the urea tank is a frozen state and an urea tank cavity occurrence state detection unit detecting whether the state of the urea tank is a cavity occurrence state.

As described above, according to the present invention, when the state of the lean NOx trap is a regeneration state (DeNOx), the state of the urea tank is a frozen state and the state of the urea tank is a cavity occurrence state, the fault erroneous detection of the SCR system may be prevented by blocking the purification efficiency diagnosis of SCR.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
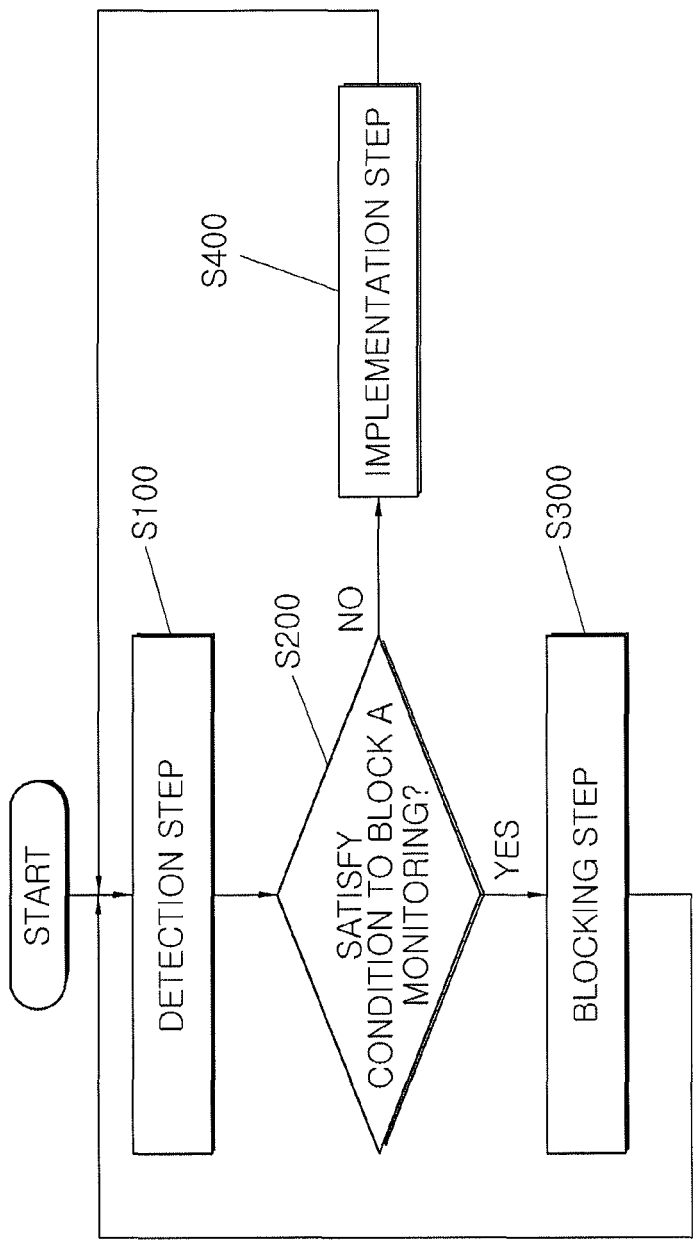
FIG. 1 and FIG. 2 are flow charts of a fault diagnosis method of the SCR system in accordance with some embodiments of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A word and term used in this specification and claim scope should not be limited to a typical or dictionary meaning and be interpreted as the meaning and concept in compliance with the technological thought of this invention based on the principle that an inventor may define the concept of a term properly in order to explain his/her own invention in the best way. Thus, because the embodiment written in this specification and the configuration illustrated in the drawings are no more than the best desirable embodiment in the present invention and do not represent all of technological thought in the present invention, it should be understood that there can be various equivalents and transformation examples to replace these at the time of this application. In addition, a detailed description about the well known function and configuration which may obscure the gist of the present invention unnecessarily may be omitted. Hereinafter a desirable embodiment in the present invention may be described in detail with reference to the attached drawings.

Figure 2:
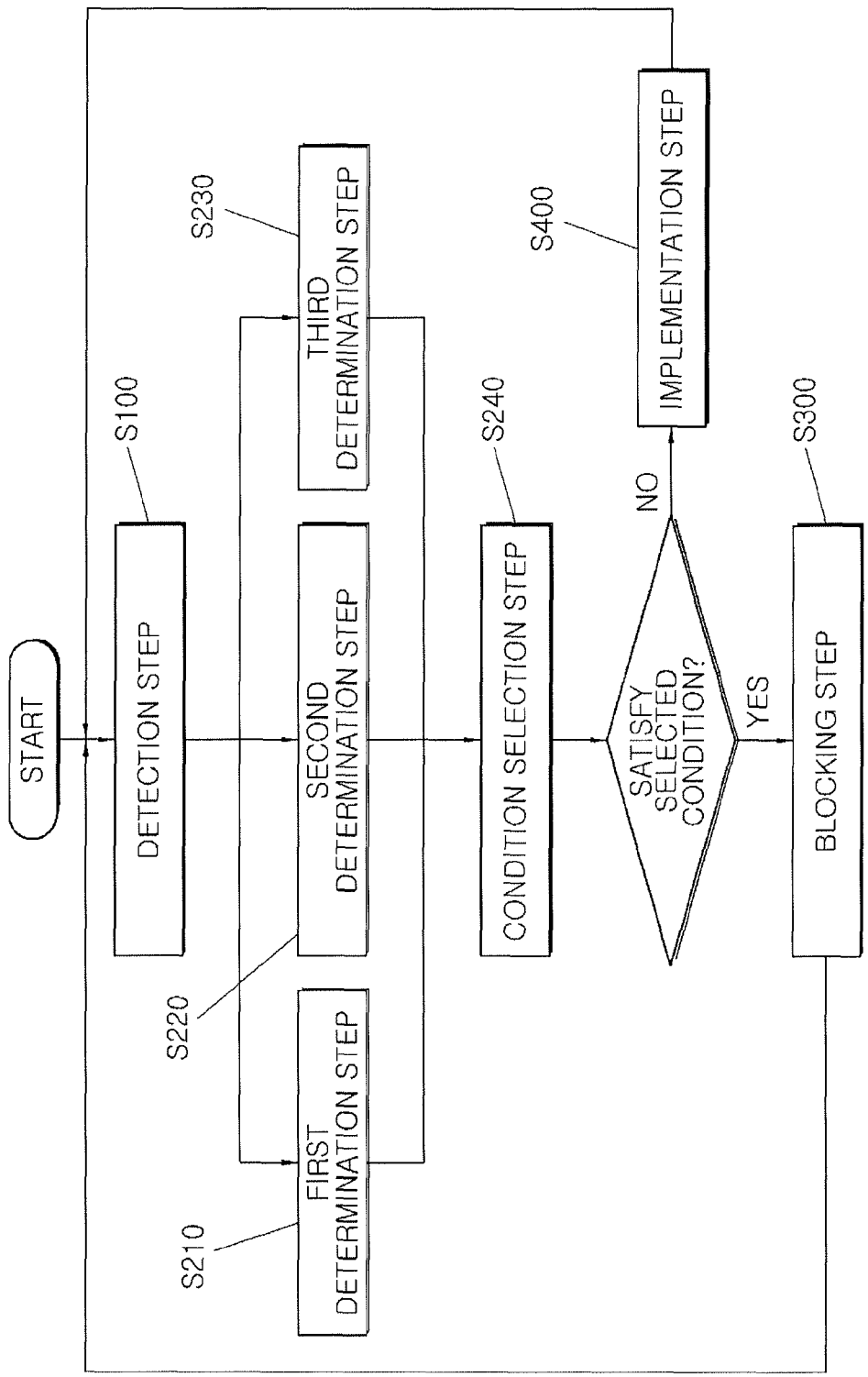

FIGS. 1 and 2 are flow charts of a fault diagnosis method of the SCR system in accordance with some embodiments of the present invent. With reference to FIGS. 1 and 2, the fault diagnosis method of the SCR system in accordance with some embodiments of the present invention may include the detection step S100, the determination step S200, the blocking step S300 and the implementation step S400.

The detection step S100 is a step detecting any one or more states of an operating state of a lean NOx trap or state of a urea tank. The detection step S100 may detect whether the operating state of the lean NOx trap is the regeneration state (DeNOx), the state of the urea tank is a frozen state and the state of the urea tank a cavity occurrence state. Whether the operating state of the lean NOx trap is the regeneration state (DeNOx), the state of the urea tank is a frozen state and the state of the urea tank is a cavity occurrence state may use conventional state detection logic.

The determination step S200 is a step determining whether the state of the lean NOx trap or the urea tank detected at the detection step S100 satisfies condition to block a monitoring of a purification efficiency of the SCR system. The determination step 200 may include a first determination step S210, a second determination step S220 and a third determination step S230.

The first determination step S210 is a step determining whether the state of the lean NOx trap detected at the detection step S100 is a regeneration state (DeNOx). The second determination step S220 is the step determining whether the state of the urea tank detected at the detection step S100 is a frozen state. The third determination step S230 is the step determining whether the state of the urea tank detected at the detection step S100 is a cavity occurrence state.

Further, the determination step may include a condition selection step S240. The condition selection step S240 may determine whether condition to block the monitoring of the purification efficiency of the SCR system in the first determination step S210, the second determination step S220 and the third determination S230 each are satisfied. Thereafter, the condition of the first determination step S210, the second determination step S220 or the third determination S230 is each assigned to an individual bit position, thereby determining whether to use any one or more conditions among the conditions of the first determination step S210, the second determination step S220 or the third determination S230 through a bit mask.

For instance, when it assumes that the state of the lean NOx trap is the regeneration state (DeNOx) or the state of the urea tank is the frozen state and is not the cavity occurrence state, if it is determined to use the conditions of the first determination step S210 and the second determination step S220 through the bit mask at the condition selection step S240, the monitoring of the purification efficiency of the SCR system may be blocked to prevent the erroneous detection of the monitoring of the purification efficiency of the SCR system.

The blocking step S300 is a step blocking the monitoring of a purification efficiency of the SCR system when it is determined that the state of the lean NOx trap or the urea tank satisfies condition to block the monitoring of a purification efficiency of the SCR system at the determination step S200. Considering the states of the lean NOx trap and the urea tank, if there is a risk of the erroneous detection for the monitoring of the purification efficiency of the SCR system, the monitoring of the purification efficiency of the SCR system is blocked. Accordingly, it is possible to perform the more strengthen monitoring of the purification efficiency of the SCR system by preventing the erroneous detection of the purification efficiency of the SCR system.

The implementation step S400 is a step implementing the monitoring of a purification efficiency of the SCR system when it is determined that the state of the lean NOx trap or the urea tank does not satisfy condition to block the monitoring of the purification efficiency of the SCR system at the determination step S200. The purification efficiency ($A_n$) of the SCR system is calculated by the formula below.

$$A_n = 1 - \frac{m_{rear\ end}}{m_{front\ end}}$$

(Here, $m_{front\ end}$ is an accumulated value of NOx mass of the front end of SCR during a pre-set time and $m_{rear\ end}$ is an accumulated value of NOx mass of the rear end of SCR during the pre-set time.)

In other words, the purification efficiency $A_n$ of the SCR system is calculated by measuring a value of $m_{front\ end}$ and $m_{rear\ end}$ at a NOx sensor disposed on the front end and the rear end of SCR (e.g., a selective catalyst reduction unit in the SCR system) or the SCR system and by dividing a difference of the accumulated values of NOx mass of the front end and the rear end of SCR or the SCR system during the pre-set time.

Figure 3:
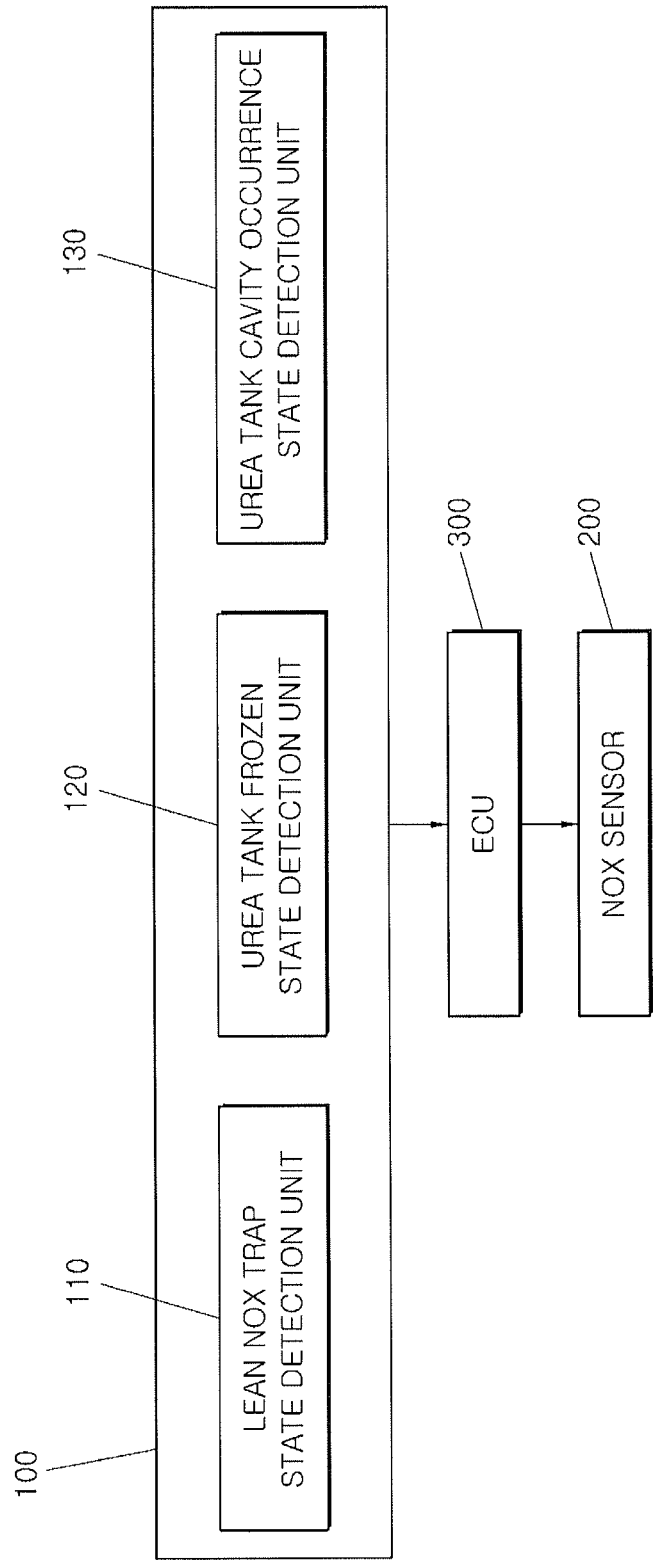
FIG. 3 is a block diagram of a fault diagnosis apparatus of the SCR system in accordance with some embodiments of the present invention.
Figure 4:
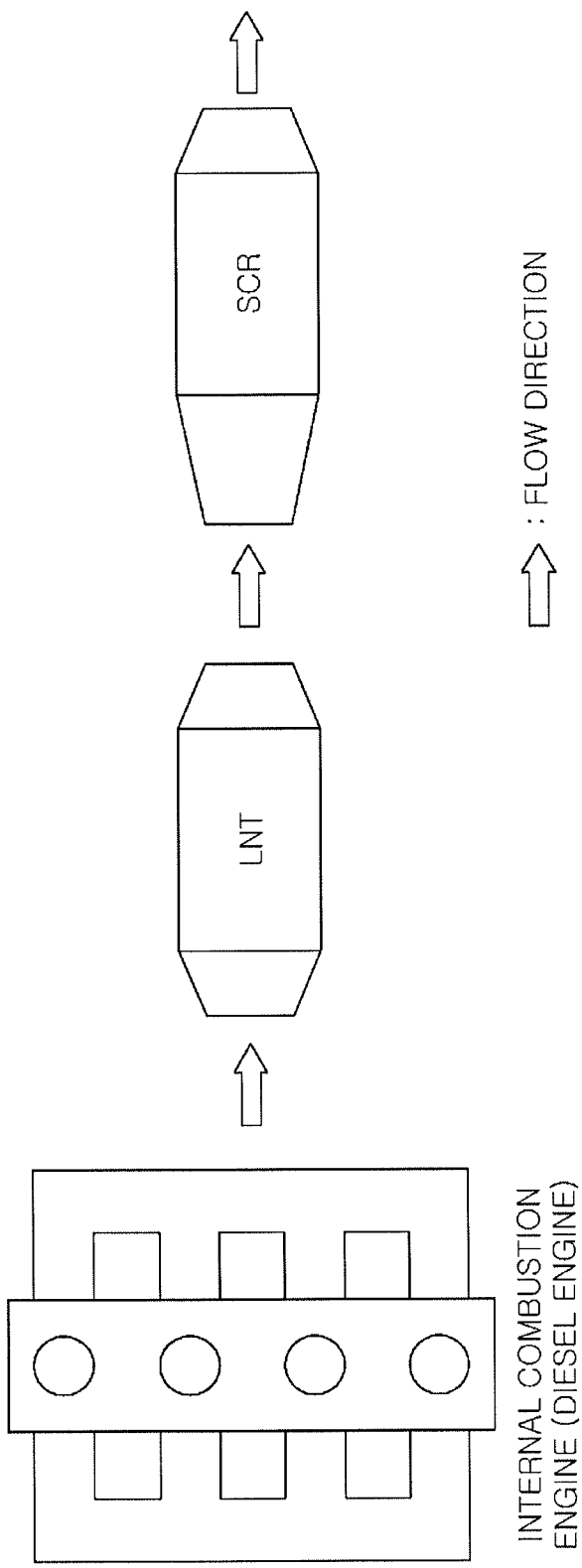
FIG. 4 is a schematic diagram of the LNT-SCR complex post-processing system.

FIG. 3 is a block diagram of a fault diagnosis apparatus of the SCR system in accordance with some embodiments of the present invent. With reference to FIG. 3, the fault diagnosis apparatus of the SCR system in accordance with some embodiments of the present invent may include a detection unit 100, a NOx sensor 200 and an ECU (electronic control unit) 300.

The detection unit 100 may detect any one more of the state of the lean NOx trap or the urea tank. The detection unit 100 may include a lean NOx state detection unit 110, a urea tank frozen state detection unit 120 and a urea tank cavity occurrence state detection unit 130. The lean NOx trap state detection unit 110 may detect whether the lean NOx trap state is the regeneration state (DeNOx), the urea tank frozen state detection unit 120 may detect whether the urea tank state is the frozen state and the urea tank cavity occurrence state detection unit 130 may detect whether the urea tank state is the cavity occurrence state.

The NOx sensor 200 may perform a role to measure the NOx mass of the front end and the rear end of the SCR or the SCR system.

The ECU 300 may determine whether to block the monitoring of the purification efficiency of the SCR system based on the information detected by the detection unit 100. Also, the ECU 300 may implement the monitoring of the purification efficiency of the SCR system in accordance with the accumulation value of the NOx mass of the front end and the rear end of SCR measured at the NOx sensor during the pre-set time.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fault diagnosis method of an exhaust gas post-processing system, comprising:
   a detection step detecting an operating state of a lean NOx trap and a state of a urea tank;
   a determination step determining, by an electronic control unit, whether the state of the lean NOx trap and the urea tank detected at the detection step satisfies a corresponding condition to block the electronic control unit's monitoring of a purification efficiency of the exhaust gas post-processing system; and
   a blocking step blocking, by the electronic control unit, the monitoring of the purification efficiency of the exhaust gas post-processing system when the state of the lean NOx trap and the urea tank at the determination step satisfies the corresponding condition to block the monitoring of the purification efficiency of the exhaust gas post-processing system,
   wherein the determination step comprises:
      a first determination step determining whether the state of the lean NOx trap detected at the detection step is a regeneration state (DeNOx);
      a second determination step determining whether the state of the urea tank detected at the detection step is a frozen state;
      a third determination step determining whether the state of the urea tank detected at the detection step is a cavity occurrence state; and
      a condition selection step determining whether condition to block the monitoring of the purification efficiency of the exhaust gas post-processing system in the first determination step, the second determination step or the third determination step is satisfied, assigning an individual bit position to the condition of the first determination step, the second determination step or the third determination step, and determining whether to use any one or more conditions among the conditions of the first determination step, the second determination step and the third determination step through a bit mask.

2. The fault diagnosis method of the exhaust gas post-processing system of claim 1, further comprising:
   an implementation step implementing the monitoring of the purification efficiency of the exhaust gas post-processing system when it is determined that the state of the lean NOx trap or the urea tank does not satisfy the corresponding condition to block the monitoring of the purification efficiency of the exhaust gas post-processing system at the determination step.

3. A fault diagnosis apparatus of an exhaust gas post-processing system equipped with a selective catalyst reduction (SCR), the apparatus comprising:
a NOx sensor disposed at a front end and a rear end of the SCR and measuring a mass of NOx of the front end and the rear end of the SCR; and
an electronic control unit configured to determine whether to block the electronic control unit's monitoring of a purification efficiency of the exhaust gas post-processing system in accordance with information detected in a detection step and implementing the monitoring of the purification efficiency of the exhaust gas post-processing system in accordance with the mass of NOx of the front end and the rear end of the SCR measured by the NOx sensor,
wherein the detection step comprises:
a lean NOx trap state detection step that detects whether the state of the lean NOx trap is a regeneration state (DeNOx);
a urea tank frozen state detection step that detects whether the state of the urea tank is a frozen state; and
a urea tank cavity occurrence state step that detects whether the state of the urea tank is a cavity occurrence state; and
wherein the electronic control unit is further configured to carry out a determination step, the determination step comprising:
a first determination step determining whether the state of the lean NOx trap detected at the detection step is a regeneration state (DeNOx);
a second determination step determining whether the state of the urea tank detected at the detection step is a frozen state;
a third determination step determining whether the state of the urea tank detected at the detection step is a cavity occurrence state; and
a condition selection step determining whether condition to block the monitoring of the purification efficiency of the exhaust gas post-processing system in the first determination step, the second determination step or the third determination step is satisfied, assigning an individual bit position to the condition of the first determination step, the second determination step or the third determination step, and determining whether to use any one or more conditions among the conditions of the first determination step, the second determination step and the third determination step through a bit mask.

* * * * *